Patented Feb. 21, 1950

2,498,226

UNITED STATES PATENT OFFICE 2,498,226

POLYMERIZATION OF COMPOUNDS CONTAINING A TERMINAL METHYLENE GROUP

Bernard Thomas Dudley Sully, Ewell, England, assignor to A. Boake Roberts and Company Limited, London, England, a British company No Drawing. Application June 29, 1948, Serial No. 35,980

9 Claims. (Cl. 260—89.1)

This invention relates to the polymerisation of compounds containing a terminal methylene group, such as methyl methacrylate, vinyl acetate, vinyl chloride, acrylonitrile, butadiene, monostyrene, homologues of monostyrene, vinyl naphthalene and vinyl naphthalene homologues. This application is a continuation-in-part of my application Serial No. 609,497, filed August 7, 1945, now abandoned.

In my co-pending application Serial No. 484,913, filed April 28, 1943, and now abondoned, I have described a process for the polymerization of a monomeric vinyl material consisting essentially of monomeric styrene, comprising continuously agitating an aqueous dispersion of such material at a temperature above 60° C. and for a period of time of from 1 to 24 hours in the simultaneous presence of (a) a water soluble salt of an oxy-acid of sulphur which in water absorbs free oxygen with resulting oxidation of its sulphur atom to a higher valency, said oxy-acid salt being selected from the group consisting of sulphites, bisulphites and hydrosulphites, (b) free oxygen occupying a vapour space above the dispersion and supplied thereto at an hourly rate of feed of from 0.0004–0.05 part by weight per 100 parts of monostyrene to be polymerised, and (c) a substance acting to catalyse the oxidation of the sulphur atom of the oxy-acid salt, said substance being a simple water soluble salt of a metal of the type known to catalyse the oxidation by gaseous oxygen of sulphites in aqueous solution (see, for instance, "A Comprehensive Treatise on Physical and Inorganic Chemistry" by J. W. Mellor, vol 10, page 264, and "Zeitschrift für Physikalische Chemie," 1903, vol. 45, page 641).

The oxy-acid salt of sulphur used may, for example, be anhydrous sodium sulphite ($Na_2SO_3$), anhydrous potassium sulphite ($K_2SO_3$), ammonium sulphite, sodium bisulphite, sodium hydrosulphite ($Na_2S_2O_4$), potassium metabisulphite ($K_2S_2O_5$) or acetone sodium bisulphite, the last-mentioned being formed, for example, in situ in the dispersion by adding acetone and sodium bisulphite thereto.

The substance acting to catalyse the oxidation reaction may, for example, be a water-soluble salt of copper or of manganese or of iron of cobalt or of chromium, and it may be added as such to the other ingredients of the dispersion or be constituted by the commoner metallic impurities such as copper and iron, that are present as traces in sulphites as above referred to, as ordinarily obtained on the market, or that may be fortuitously present in one or other of the remaining ingredients of the dispersion, it having been found that the merest trace of, say, copper sulphate in the dispersion will suffice for the purposes of the reaction, particularly if the quantity of available oxygen present in the reaction sphere, and therefore the rate of feed of oxygen thereto (since the oxygen becomes used up as fast as it is supplied to the reaction sphere) be kept very small in the sense indicated in my said prior application Serial No. 484,913, for example of the order, as regards concentration, of 0.01% by volume of the vapour space above the dispersion (i. e. in the reaction vessel), and as regards rate of feed, of 0.005–0.024 part by weight per 100 parts of monostyrene to be polymerised.

With the use of such a process and particularly if a very small rate of feed of oxygen as referred to above and correspondingly slow rate of oxidation be employed in the reaction, it is possible to produce polystyrene of an average molecular weight well above 100,000 (for example up to 500,000), with a high yield (e. g. substantially complete polymerisation of the styrene) and in a relatively short polymerisation time (e. g. from 1 to 5 hours), the product being capable, moreover, of easy purificatiton. These results are obtainable even when operating at relatively high temperatures, for example temperatures upwards of say 75° C. and more usually just below the boiling point of the dispersion (e. g. 90° C.)—a fact which is remarkable in view of the well known tendency in the polymerisation of styrene, for high temperatures and catalysts to favour the production of low average molecular weight polymers.

In my co-pending application Serial No. 544,458, filed July 11, 1944, and now abandoned, I have described a similar process to that described in the aforesaid applicatiton Serial No. 484,913, according to which, in place of a water-soluble salt of an oxy-acid of sulphur which in water absorbs free oxygen with resulting oxidation of its sulphur atom to a higher valency, free sulphur dioxide is employed.

I have now found as the result of further investigation that the process, both in the form thereof using an oxidisable sulphite as referred to and in the form using free sulphur dioxide, separately from or conjointly with the use of an oxidisable sulphite, is capable of application, as regards the starting material, to other compounds containing a terminal methylene group (it being understood, of course, that monostyrene falls within the category of such compounds), for example, the specific compounds of this type hereinbefore mentioned.

I have also found that excellent results are obtainable when, instead of introducing the necessary controlled quantity of oxygen (for the oxidation of the oxy-acid sulphur salt or sulphur dioxide employed) into the dispersion indirectly, through the intermediary of a vapour space above the despersion, it is introduced directly, preferably in one or other of the following forms:

(1) Pure oxygen gas in solution in water, the gas being dissolved in the water to an extent which is based on the known solubility of oxygen in water.

(2) Oxygen as air, in solution in water.

(3) Oxygen in nascent form, produced within the dispersion by electrolytic action therein, using electrodes in contact with the dispersion.

I have further found that the necessary oxidation of the sulphur-oxygen compound can be achieved by way of chemical interaction in situ in the dispersion as between the sulphur-oxygen compound therein (oxy-acid sulphur salt or sulphur dioxide) and an oxygen-yielding compound such as hydrogen peroxide, ethyl benzene peroxide, benzoyl peroxide or tetralin hydroperoxide, also present in the dispersion, or as between the sulphur-oxygen compound therein (oxy-acid sulphur salt or sulphur dioxide) and a metal salt (e. g. $CuSO_4$) reducible to a lower valency by such interaction.

My further investigations have also shown that the direct method of introducing the oxygen into the dispersion by one or other of the three modes (1), (2), (3) set forth above, and also the methods just described of achieving the necessary oxidation in the process are applicable to compounds containing a terminal methylene group generally, including in particular the specific compounds of this category hereinbefore mentioned.

The method according to the present invention, of introducing the necessary controlled amount of oxygen into the dispersion directly, and also the method referred to of achieving the necessary oxidation of the sulphur-oxygen compound by interaction in situ in the dispersion as between the sulphur-oxygen compound therein and either an oxygen-yielding compound (e. g. a peroxide) or a metal salt capable of being reduced to a lower valency as the result of the interaction, are advantageous, more especially in the production of high average molecular weight products, for which, as already indicated, it is necessary to establish and maintain a close control of the oxidation in that with these methods the necessary close control is readily establishable and maintainable.

When effecting the oxidation with the use of an oxygen-yielding compound or a metal salt as referred to above, the quantity used of the compound or salt would depend upon the required average molecular weight of the polymer mixture to be obtained, since this in turn depends upon the operating rate of oxidation in the process. The same would apply also when any of the modes (1), (2), (3) of oxygen supply to the dispersion was employed; the quantity of oxygen supplied would again depend on the required average molecular weight of the polymer mixture to be obtained. Preliminary trial will always suffice to indicate the requisite quantity in any given case, although such quantity will in every case be sufficiently restricted to limit the rate of oxidation of the sulphur-oxygen compound to a rate which is equivalent to that which would result from an hourly rate of feed of oxygen to the dispersion of from 0.0004–0.05 part by weight per 100 parts of monostyrene to be polymerised as in the processes of the applications Serial No. 484,913 and Serial No. 544,658 aforesaid, and the total oxidation in the polymerisation to a figure equivalent to a total oxygen consumption in the process not in excess of 0.1 and usually between 0.1 and 0.01, part by weight of oxygen per 100 parts of material submitted to polymerisation, again as in the processes of said applications Serial No. 484,913 and Serial No. 544,458, conditions which would result in cessation of oxidation of the sulphur-oxygen compound having always to be avoided, at any rate for any extended period in the course of the reaction.

As is also true of the processes of the earlier applications referred to in the preceding paragraph, the pH of the aqueous medium of the dispersion is a factor of importance, more especially for the successful production of high average molecular weight products. It is preferably between pH 8 and pH 10 when the catalyst used in the process is a salt of copper, whereas when a salt of iron is employed the pH is preferably on the acid side of strict neutrality.

The sulphur-oxygen compound used in the process of the present invention may be any of the oxy-acid sulphur salts mentioned above as used in the process of the earlier application Serial No. 484,913, or alternatively free sulphur dioxide ($SO_2$ gas) as used in the process of the earlier application Serial No. 544,458. In short, it may be any sulphur-oxygen compound normally having reducing properties and susceptible to oxidation by dissolved oxygen in an aqueous medium. In a similar way the catalyst used to promote the oxidation of the sulphur-oxygen compound, or as the case may be the metal salt used to effect the oxidation by interaction with the sulphur-oxygen compound, may be any of the polyvalent metal salts mentioned in the earlier applications Serial No. 484,913 and Serial No. 544,458, that is to say, practically any water-soluble salt of copper, manganese, iron, cobalt, chromium, provided, in the case where the salt is used to effect the oxidation by interaction with the sulphur-oxygen compound, it is one which is reducible to a lower valency by the interaction, and it may be either added as such to the dispersion or in the case where it acts in the capacity of a catalyst to promote the oxidation of the sulphur-oxygen compound, constituted at least in part by the commoner metallic impurities present in the sulphur-oxygen compound and/or the other ingredients used to form the dispersion.

For the purposes of a close control of the oxidising and polymerising conditions in carrying the process of the present invention into effect, it is frequently advantageous or necessary, as in the case of the processes described in the earlier applications, to remove from the material to be polymerised any free oxygen or peroxidic substance that may be contained in it prior to its dispersion in the aqueous medium, and similarly to remove any free oxygen that may be present in the aqueous vehicle of the dispersion or in any of the materials dissolved or dispersed therein other than the material to be polymerised.

Also it is generally desirable for considerations of manufacture and for the production of products of relatively higher average molecular weight, again as in the processes of the earlier applications, to employ a starting material which has been freshly distilled or otherwise purified prior to use, for example, by one or other of the methods disclosed in the earlier applications. Aged styrene, for example, which has not been carefully purified and freshly distilled, may possess an initial inhibition period for as long as several hours, which in some cases may be so prolonged that the oxidation of the sulphite or other sulphur-oxygen compound employed reaches the stage of completion before polymerisation to any extent begins. In this connection, it may be remarked that one of the desirable effects of the presence of a catalytic substance (e. g. copper sulphate) in the dispersion is to reduce any period of inhibition that may tend to obtain, particularly in a case where an emulsion stabiliser, e. g. gelatine, is present in the dispersion.

An emulsifying agent may be used in the process, again as in the processes of the earlier applications, the substance selected for this purpose varying with the sulphur-oxygen compound employed. For example, where a neutral or alkaline sulphite is employed, the emulsifier used may be a sodium, potassium or ammonium soap. Where on the other hand, an acid sulphite is employed, the emulsifier used may be a sulphonate of a higher alcohol such as lauryl sulphonate.

A protective colloid may also be used for stabilising the dispersion during the polymerisation, again as in the processes of the earlier applications, suitable substances for this purpose including, for example, gelatine, methyl cellulose, polyvinyl alcohol, saponin and gum arabic. In such cases, the action of the catalyst is, in general, slowed down and accordingly a larger amount of the catalyst has to be employed for an efficient polymerisation than would be required otherwise.

It is possible to employ as the starting material in the process, again as in the processes of the earlier applications, monostyrene or a homologue thereof containing a diluent ingredient, for example ethyl benzene, without prejudice to successful polymerisation.

The amount of available $SO_2$ in the dispersion at the commencement of the reaction should in general be of the order of 0.1 to 2.5% reckoned upon the total weight of the dispersion—assuming a monomer concentration thereof of the order of 20-40% by weight, an optimum amount for most cases being in the neighbourhood of 0.5%. Any excess used over the amount which is actually consumed in the polymerisation has to be removed from the product by washing (e. g. with distilled water) and as this involves additional expense, it is desirable to avoid it as far as possible by the use of correctly determined amounts in making up the dispersion. The whole quantity need not be present initially; part may be added during the course of the polymerisation.

The results obtained in the process are generally improved when the compound to be polymerised is added to a solution of the rest of the solids of the dispersion, being run thereinto continuously or discontinuously at a controlled rate, and while the solution is being efficiently stirred.

The concentration of the dispersion in respect of compound to be polymerised should generally be such as to give a concentration of solids as polymer in the final (polymerised) dispersion of from 10-40% reckoned on the total weight of the dispersion.

*Example 1*

A mixture of 100 grammes of distilled water, 0.25 gramme of anhydrous sodium sulphite ($Na_2SO_3$) and 0.4 gramme of sodium bisulphite ($NaHSO_3$), 0.1 cc. of N/10 copper sulphate solution was heated to 70° C. and into it, while stirring, methyl methacrylate was run at an average rate of about 1 cc. per minute until 50 ccs. had been added. The reaction was exothermic and the mixture was cooled by means external to the reaction vessel to prevent it from boiling during the reaction. In this way, it was ensured that air should be present in the vapour space above the reaction mixture throughout the reaction, but with no other control of its supply or access to the aqueous bath. Polymerisation was complete in about half an hour.

*Example 2*

A mixture of 190 grammes of distilled water, 100 grammes of methyl methacrylate, 10 ccs. of a 10% aqueous solution of acetone bisulphite having a pH of 6.0 and 0.2 cc. of N/10 copper sulphate solution was heated to 50° C. with continuous stirring. Polymerisation was complete in 15 hours, the polymethyl methacrylate which separated from the mixture was obtained in substantially 100% yield and had an average molecular weight of 170,000 as determined by the Staudinger viscosity method, using the constant $1.8 \times 10^{-4}$ and a concentration of 0.01 basal molecule of the polymer in benzene. It is to be noted that the temperature of the dispersion was lower than that for Example 1; also, the amount of gaseous oxygen present was more limited.

*Example 3*

The conditions in this example were the same as those in Example 2 with the exception that the operating temperature was increased to 60° C. Complete polymerisation was obtained in 3½ hours and the polymerisation product had an average molecular weight of 65,000. The reduction in the average molecular weight was due in part to operating at a higher temperature than in Example 2.

*Example 4*

An aqueous dispersion was prepared by emulsifying 75 grammes of distilled m-ethyl styrene, 150 grammes of distilled water, 0.5 gramme of stearic acid, 0.95 gramme of anhydrous sodium sulphite and 6 ccs. of 0.427 N ammonium hydroxide solution and 0.00025 gramme of copper in the form of copper sulphate. The resulting dispersion was heated to 90° C. in a closed vessel and stirred therein while passing through the vessel a slow stream of commercial nitrogen containing about 0.1% oxygen. Polymerisation was complete in about 15 hours and the product had an average molecular weight of 157,000.

*Example 5*

200 ccs. of a 1% aqueous sodium sulphite solution and 0.5 cc. of a mixed M/10 $CuSO_4$-M/5 $MnSO_4$ solution was warmed to 50° C. with agitation in the presence of air admitted to the surface of the aqueous medium of the dispersion. On running in vinyl acetate with continued agitation in the presence of air, a rapid polymerisation was obtained.

*Example 6*

This example, which is in two parts (a), (b), is a further example illustrating the use of free sulphur dioxide in the process in place of an oxidisable sulphite and demonstrates that a mere trace of oxygen in the system will suffice to ensure an effective polymerisation.

Part (a).—80 grammes of freshly distilled monostyrene, 160 grammes of distilled water, 0.5 gramme of sulphonated lauryl alcohol, 0.2 gramme of sulphur dioxide and 0.1 cc. of a N/10 copper sulphate ($CuSO_4$) solution were stirred at 93.0° C. (not quite refluxing) for 5 hours. During this period a slow current of commercial nitrogen containing 0.1% by volume of oxygen was passed over the surface of the emulsion. The rate of flow of the gas averaged 20 ccs. per minute and corresponded to a total oxygen consumption by the styrene material of about 6 ccs. during the course of the polymerisation. All the styrene was converted to polymer and the average molecular weight of the product was 495,000.

Part (b).—The same mixture was stirred at 93.5° C. (just refluxing) for five hours in the presence of a current of pure sulphur dioxide gas which was passed over the mixture at a slow rate, sufficient to ensure against the diffusion of air into the polymeriser via the condenser, after the vapour space above the mixture had been flushed out with pure nitrogen. At the end of the five hours the polymer content of the product, as determined by the methanol extraction method, was 12.3% and the average molecular weight was 124,500.

Example 7

75 grammes of pure (i. e. freshly distilled) monostyrene, 150 grammes of distilled water, 9 ccs. of 0.5 mol. commercial acid sodium sulphite ($NaHSO_3$) and 0.9 gramme of sulphonated lauryl alcohol were mixed with stirring, in a closed vessel immersed in a thermostatic bath at 90° C. and connected to an air reservoir. Emulsification occurred immediately and the emulsion had a pH of about 4. At the end of about 9 hours polymerisation was complete. The polystyrene obtained had a specific viscosity of 0.725, equivalent to an average molecular weight of 403,000. Under the conditions of this experiment some free sulphur dioxide was evolved in the dispersion from the sulphite therein.

Example 8

This example illustrates the case where the necessary oxygen for oxidation of the sulphur-oxygen compound is supplied to the dispersion in the form of a solution of air in water.

The following mixture was prepared in a closed flask with mechanical stirring at a temperature of 90° C., adding the components in the order given:

| | |
|---|---|
| Sodium sulphite crystals ($Na_2SO_3.7H_2O$) gms__ | 6 |
| Stearic acid _____gms__ | 3 |
| Sodium borate _____grm__ | 0.6 |
| Copper sulphate _____grm__ | 0.0014 |
| Distilled water _____mls__ | 375 |

The sodium borate was added to maintain the alkalinity of the emulsion and to increase its stability. The copper sulphate was added to the water before the addition of the other ingredients and served to catalyse the oxidation of the sulphite with the oxygen. 75 mls. of pure monomeric styrene was then added and was polymerised in approximately 90 minutes. Thereafter at intervals of approximately half an hour 25 mls. of distilled water saturated with air and 25 mls. of distilled styrene were added. The required slow oxidation of the sodium sulphite in the presence of a trace of copper was continued in this manner until 200 mls. of styrene and 125 mls. of air saturated water had been added. If no air-saturated water had been added then the polymerisation would have stopped after the first addition of styrene had been polymerised. The initial polymerisation was due to the air which was fortuitously contained in the ingredients, together with the oxidising action of the trace of copper sulphate used as the initial catalyst. The molecular weight of the product obtained in this way, after coagulation with hydrochloric acid and washing free from salts with distilled water, was 519,000.

Example 9

The polymerising bath employed in this example had the following composition:

| | |
|---|---|
| Sodium metabisulphite ($Na_2S_2O_5$)___gms__ | 1.50 |
| Sulphonated petroleum _____ gms__ | 2.0 |
| Distilled water _____mls__ | 200 |

The temperature of the bath was raised to 80° C. and 50 mls. of monomeric styrene was added. Then at zero time and at hourly intervals for a total of 4 hours, 10 mls. of a 1% solution of oxygen-free ferric chloride was added. In addition ½% of methyl cellulose was added after 2 hours to maintain the emulsion in a stable condition. The completely polymerised emulsion was coagulated by the addition of hydrochloric acid. After washing, filtering and drying, the resulting polystyrene had a molecular weight greater than 100,000.

Example 10

This example illustrates a variation of the method in which the slow oxidation of the sodium sulphite is caused by the passage of an electric current in a manner calculated to oxidise an amount of the sulphite equivalent to that oxidised by the air in the first example.

| | |
|---|---|
| Sodium sulphite (anhydrous) _____gms__ | 3 |
| Stearic acid _____gms__ | 1.2 |
| Distilled water (oxygen free) _____mls__ | 600 |
| Caustic soda (4% solution) _____mls__ | 1.2 |

The mixture was stirred for half an hour at a temperature of 90° C. and a current of 20 milliamperes was passed through the solution. Distilled styrene (120 mls.) was then added. A sample of the emulsion taken after 5 hours showed that the polymerisation was complete. The time of reaction, the temperature of operation and the product obtained are similar to those in the first example in which the sodium sulphite is oxidised with oxygen dissolved in water. In an efficient polymerisation it is not normally necessary to oxidise more than one fifth of the sulphite used and the passage of the current may be conveniently made intermittent. Copper electrodes may be used, in which case no added copper catalyst is necessary.

The molecular weights given herein are as determined by the Staudinger formula, which is as follows:

$$M = \frac{\eta sp}{C.Km}$$

where $\eta sp$ is the specific viscosity, i. e.

$$\frac{\eta \text{ solution}}{\eta \text{ solvent}} - 1$$

C is the concentration of polymer expressed as basal mols. per litre and $Km=1.8\times10^{-4}$ (Staudinger's constant), using in the tests a concentration of 0.01 basal mol. of the polymer in benzene.

It will be appreciated of course that for the purposes of obtaining reproducible results, more especially as regards average molecular weight, it is advisable and usually necessary to employ a known predetermined amount of the substance acting to catalyse the oxidation of the sulphur-oxygen compound during the course of the polymerization, for which reason it is generally necessary to add further quantities of said substance over and above any quantity that may be provided fortuitously by the metallic impurities present in the sulphur-oxygen compound and/or other constituents of the polymerisation mixture. In this connection it may be remarked that although the merest traces only of such metals as copper, iron, manganese, chromium or cobalt will function in the catalyst system of the invention, the rate of polymerisation and the average molecular weight of the polymers obtained are to a considerable extent dependent upon the quantity of metal in the catalyst system, with the result that when working with extremely minute traces of such metal, as when depending upon the metallic impurities in the ingredients of the dispersion, any variations in the quantity of metal present (which variations will be unavoidable when the metal is constituted solely by the metallic impurities referred to) tend to interfere with reproducibility and predeterminability of the product of the process, particularly in respect of average molecular weight. By increasing, however, the quantity of metal present in the system, by adding a further quantity to that already present in the form of metallic impurities, the resultant effect upon the product of the polymerisation of small variations in the quantity of metal in the system is correspondingly reduced, with the result that predeterminability and reproducibility of the product are readily obtainable.

Without binding myself to any expressed theory as to the mechanism of the polymerisation reaction which takes place in my process, I have reason to believe that the polymerisation of a monomeric polymerizable compound having a terminal methylene group in an aqueous emulsion of a sulphite or of sulphur dioxide is initiated by the formation of monothionic acid or an ion of monothionic acid ($HSO_3$ or $.SO_3^-$) which has the property of a free radical. Monothionic acid has never been isolated because as is usual with free radicals two molecules combine together to form dithionic acid ($H_2S_2O_6$), a known acid whose salts can be isolated in the pure state. It is known that monothionic acid free radicals or monothionic acid free radical ions are formed in the aqueous sulphite solutions by the presence of a minute amount of metallic impurity, as for example a trace of copper. In the process of the formation of a monothionic acid free radical or a monothionic acid free radical ion the metal catalyst present in a trace only is reduced to a lower state of oxidation in which state it is no longer capable of producing any more radicals. This is the accepted theory for the function of copper in the oxidation of sulphite solutions. For example:

If, now, an excess of gaseous oxygen is present in the atmosphere over an emulsion of sulphite and the polymerizable compound having a terminal methylene group the monothionic radicals preferentially activate the efficient oxidation of the sulphite in the known manner without the simultaneous polymerisation of said polymerizable compound. On the other hand, when an excess of oxygen is avoided by restriction or control, the monothionic acid radical or radical ion is caused to combine with the said polymerisable compound with the formation of a radical of the said compound which serves as the starting point for a more effective chain reaction resulting in the formation of polymer in accordance with the free radical theory of polymer formation. Thus, it is believed that the true function of the oxygen in the process is to oxidise the metallic catalyst back to the higher valency form so that by combination with the sulphite ion or sulphur dioxide present it can once again lead to the formation of a monothionic acid radical or radical ion.

What I claim as my invention and desire to secure by Letters Patent of the United States is:

1. A process for the polymerization in aqueous dispersion of polymerizable compounds containing a terminal methylene group which comprises heating the dispersion for a period of time of from 1 to 24 hours in the presence of: (a) a sulphur compound selected from the group consisting of sulphites and free sulphur dioxide, said sulphur compound being dissolved in the aqueous phase of the dispersion; (b) oxygen to oxidise the sulphur compound; and (c) a salt selected from the class of metal salts that catalyse sulphite oxidation; and controlling the concentration of the oxygen available within the reaction sphere by carrying out the reaction in a closed space, and supplying an hourly rate of feed from 0.0004 to 0.05 part by weight of oxygen per 100 parts by weight of the compound to be polymerized.

2. A process for the polymerization in aqueous dispersion of polymerizable compounds containing a terminal methylene group which comprises heating the dispersion for a period of time of from 1 to 24 hours in the presence of: (a) a sulphur compound selected from the group consisting of sulphites and free sulphur dioxide, said sulphur compound being dissolved in the aqueous phase of the dispersion; (b) oxygen to oxidise the sulphur compound introduced into the aqueous phase in the form of an aqueous solution of molecular oxygen; and (c) a salt selected from the class of metal salts that catalyse sulphite oxidation; and controlling the concentration of the oxygen available within the reaction sphere by carrying out the reaction in a closed space, and supplying an hourly rate of feed of from 0.0004 to 0.05 part by weight of oxygen per 100 parts by weight of the compound to be polymerized.

3. A process for the polymerization in aqueous dispersion of polymerizable compounds containing a terminal methylene group which comprises heating the dispersion for a period of time of from 1 to 24 hours in the presence of: (a) a sulphur compound selected from the group consisting of sulphites and free sulphur dioxide, said sulphur compound being dissolved in the aqueous phase of the dispersion; (b) oxygen to oxidise the sulphur compound introduced into the aqueous phase as nascent oxygen produced in situ within the dispersion by electrolytic action; and (c) a salt selected from the class of metal salts that catalyse sulphite oxidation; and controlling the concentration of the oxygen available within the reaction sphere by carrying out the reaction in a closed space, and supplying an hourly rate of feed of from 0.0004 to 0.05 part by weight of oxygen per 100 parts by weight of the compound to be polymerized.

4. A process for the polymerization in aqueous dispersion of polymerizable compounds containing a terminal methylene group which comprises heating the dispersion for a period of time of from 1 to 24 hours in the presence of: (a) a sulphur compound selected from the group consisting of sulphites and free sulphur dioxide, said sulphur compound being dissolved in the aqueous phase of the dispersion; (b) oxygen to oxidise the sulphur compound introduced into the aqueous phase as nascent oxygen produced in situ in the dispersion by chemical interaction therein between the sulphur compound in the dispersion and an oxygen-yielding substance also present therein with resulting oxidation of the sulphur compound; and (c) a salt selected from the class of metal salts that catalyse sulphite oxidation; and controlling the concentration of the oxygen available within the reaction sphere by carrying out the reaction in a closed space, and supplying an hourly rate of feed of from 0.0004 to 0.05 part by weight of oxygen per 100 parts by weight of the compound to be polymerized.

5. A process as claimed in claim 1, wherein the reaction is carried out at a temperature of 90° C.

6. A process as claimed in claim 1, wherein the sulphite is sodium sulphite and the metal salt is a copper salt.

7. A process as claimed in claim 1, wherein the polymerizable compound is vinyl acetate.

8. A process as claimed in claim 1, wherein the polymerizable compound is vinyl chloride.

9. A process as claimed in claim 1, wherein the polymerizable material is styrene.

BERNARD THOMAS DUDLEY SULLY.

REFERENCES CITED

The following references are of record in the file of this patent:

UNITED STATES PATENTS

| Number | Name | Date |
| --- | --- | --- |
| 2,356,925 | Fryling | Aug. 29, 1944 |
| 2,379,431 | Fryling | July 3, 1945 |
| 2,383,055 | Fryling | Aug. 21, 1945 |